United States Patent
Goel et al.

(10) Patent No.: US 12,289,537 B2
(45) Date of Patent: Apr. 29, 2025

(54) METHOD AND SYSTEM FOR PERFORMING IMAGE SIGNAL PROCESSING

(71) Applicant: SAMSUNG ELECTRONICS CO., LTD., Suwon-si (KR)

(72) Inventors: Manish Goel, Bengaluru (IN); Girish Kalyanasundaram, Bengaluru (IN); Puneet Pandey, Bengaluru (IN); Manjit Hota, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 18/323,500

(22) Filed: May 25, 2023

(65) Prior Publication Data

US 2024/0334072 A1    Oct. 3, 2024

(30) Foreign Application Priority Data

Mar. 27, 2023 (IN) .............. 202341022420

(51) Int. Cl.
*H04N 23/80* (2023.01)
*H04N 25/46* (2023.01)
*H04N 25/74* (2023.01)

(52) U.S. Cl.
CPC ............. *H04N 23/80* (2023.01); *H04N 25/46* (2023.01); *H04N 25/74* (2023.01)

(58) Field of Classification Search
CPC ........ H04N 23/80; H04N 25/46; H04N 25/47; H04N 25/74; H04N 25/779
See application file for complete search history.

(56) References Cited

U.S. PATENT DOCUMENTS

| 7,941,006 B2 | 5/2011 | Fuchigami |
| 10,368,098 B2 * | 7/2019 | Lee ............... H04N 19/176 |
| 11,361,718 B2 | 6/2022 | Lee et al. |
| 12,075,056 B2 * | 8/2024 | Choi .............. H04N 19/159 |

(Continued)

FOREIGN PATENT DOCUMENTS

JP    2011114537    6/2011

OTHER PUBLICATIONS

Hossein Mohtasham, et al., "Real-time Image Signal Processor Stats Management to Save Power and CPU Cycles", Technical Disclosure Commons (Jun. 10, 2020).

(Continued)

*Primary Examiner* — Hung H Lam
(74) *Attorney, Agent, or Firm* — Morgan, Lewis & Bockius LLP

(57) ABSTRACT

A method of performing image signal processing includes: determining whether at least one neighbor pixel is available for each of a plurality of current pixels in a current block, wherein each of the plurality of current pixels has a current pixel value; estimating a predict pixel value for each of the plurality of current pixels in the current block based on a pixel value of the at least one neighbor pixel corresponding to each of the plurality of current pixels, using at least one of a plurality of predefined prediction modes; determining a difference metric between the predict pixel value and the current pixel value for each of the plurality of current pixels; and obtaining a processed pixel value for each of the plurality of current pixels based on the difference metric.

20 Claims, 11 Drawing Sheets

(56) References Cited

U.S. PATENT DOCUMENTS

| | | |
|---|---|---|
| 2003/0138104 A1* | 7/2003 | Marks .................. H04N 1/4486 |
| | | 380/243 |
| 2006/0146930 A1 | 7/2006 | Kim et al. |
| 2007/0253483 A1 | 11/2007 | Lee et al. |
| 2011/0122299 A1 | 5/2011 | Tatsuzawa |
| 2012/0081553 A1 | 4/2012 | Cote et al. |
| 2012/0200754 A1 | 8/2012 | Fainstain et al. |
| 2013/0229395 A1 | 9/2013 | Mills et al. |
| 2014/0334542 A1* | 11/2014 | Lee ...................... H04N 19/159 |
| | | 375/240.12 |
| 2015/0195567 A1 | 7/2015 | Francois et al. |
| 2016/0119635 A1* | 4/2016 | Kwon .................. H04N 19/174 |
| | | 375/240.24 |
| 2021/0250607 A1 | 8/2021 | Chen et al. |
| 2022/0214736 A1 | 7/2022 | Shankar et al. |

OTHER PUBLICATIONS

Liu Lifen, "Low-Power Column-Parallel ADC for CMOS Image Sensor by Leveraging Spatial Likelihood in Natural Scene", Nanyang Technological University, Apr. 12, 2015.

\* cited by examiner

METHOD AND SYSTEM FOR PERFORMING IMAGE SIGNAL PROCESSING

CROSS-REFERENCE TO RELATED APPLICATION

This U.S. non-provisional patent application claims priority under 35 U.S.C. § 119 to Indian patent application Ser. No. 202341022420, filed on Mar. 27, 2023, in the Indian Patent Office, the disclosure of which is incorporated by reference in its entirety herein.

TECHNICAL FIELD

The present disclosure generally relates to a method and system for performing image signal processing (ISP).

DISCUSSION OF RELATED ART

Support and demand for camera sensors in an electronic device, such as a desktop computer, a notebook computer, a cellular phone, or a portable media player has increased rapidly in recent years. The image/video data captured by the camera sensor is processed by an image signal processor, which may apply various processing operations to the image/video data to generate a full image/video for display on a display device.

There is an increasing demand for the capability of an image signal processor to process image/video data at a high frame rate and a high resolution. However, power consumption is an issue when the frame rate and the resolution are increased excessively.

Further, there is an increasing demand for the electronic device to support always ON (AON) applications such as Auto Exposure (AE), motion detection, face detection, facial recognition, applications power gating till motion, activation based on motion sensing, and a dynamic resolution change based on different scenarios. AON applications have even more stricter power requirements, considering the image signal processor has to work when the device is locked and a user is not actively using the device. An extra image signal processor may be used to support the AON applications. However, adding an extra image signal processor increases the cost of manufacturing and complexity.

SUMMARY

An embodiment of the present disclosure provides a method for performing image signal processing (ISP). The method includes determining whether at least one neighbor pixel is available for each of a plurality of current pixels in a current block, wherein each of the plurality of current pixels has a current pixel value, estimating a predict pixel value for each of the plurality of current pixels in the current block based on a pixel value of the at least one neighbor pixel corresponding to each of the plurality of current pixels, using at least one of a plurality of predefined prediction modes, in response to determining that the at least one neighbor pixel is available for each of the plurality of current pixels in the current block, determining a difference metric between the predict pixel value and the current pixel value for each of the plurality of current pixels, and obtaining a processed pixel value for each of the plurality of current pixels by one of: performing the ISP on the current block of plurality of current pixels, when the difference metric is above a predefined threshold value, and replacing the current pixel value of each of the plurality of current pixels with a pre-processed pixel value corresponding to the at least one neighbor pixel for the each of the plurality of current pixels, when the difference metric is not above the predefined threshold value.

In an embodiment, a system for performing image signal processing (ISP), is disclosed. The system includes a memory and a processor coupled to the memory. The processor is configured to: determine whether at least one neighbor pixel is available for each of a plurality of current pixels in a current block, wherein each of the plurality of current pixels has a current pixel value, estimate a predict pixel value for each of the plurality of current pixels in the current block based on a pixel value of the at least one neighbor pixel corresponding to each of the plurality of current pixels, using at least one of a plurality of predefined prediction modes, in response to determining that the at least one neighbor pixel is available for each of the plurality of current pixels in the current block, determine a difference metric between the predict pixel value and the current pixel value for each of the plurality of current pixels, and obtain a processed pixel value for each of the plurality of current pixels by one of: perform the ISP on the current block of plurality of current pixels, when the difference metric is above a predefined threshold value, and replace the current pixel value of each of the plurality of current pixels with a pre-processed pixel value corresponding to the at least one neighbor pixel for the each of the plurality of current pixels, when the difference metric is not above the predefined threshold value.

In an embodiment, a method for processing pixels of an image sensor includes: estimating a predict pixel value for a pixel of among the pixels having a current pixel value using at least one of the pixels neighboring the pixel; determining a difference metric between the predict pixel value and the current pixel value; performing, by an image signal processor, an operation on the predict pixel value when the difference metric is greater than a threshold to generate image data; and generating the image data based on the predict pixel value when the difference metric is not above the threshold without using the image signal processor. The at least one neighboring pixel may have a same color as the pixel.

BRIEF DESCRIPTION OF THE DRAWINGS

Embodiments of the disclosure will be more clearly understood from the following detailed description taken in conjunction with the accompanying drawings in which:

FIGS. 9(a)-9(d) illustrate Tables 1-4.

DETAILED DESCRIPTION

Figure 1:
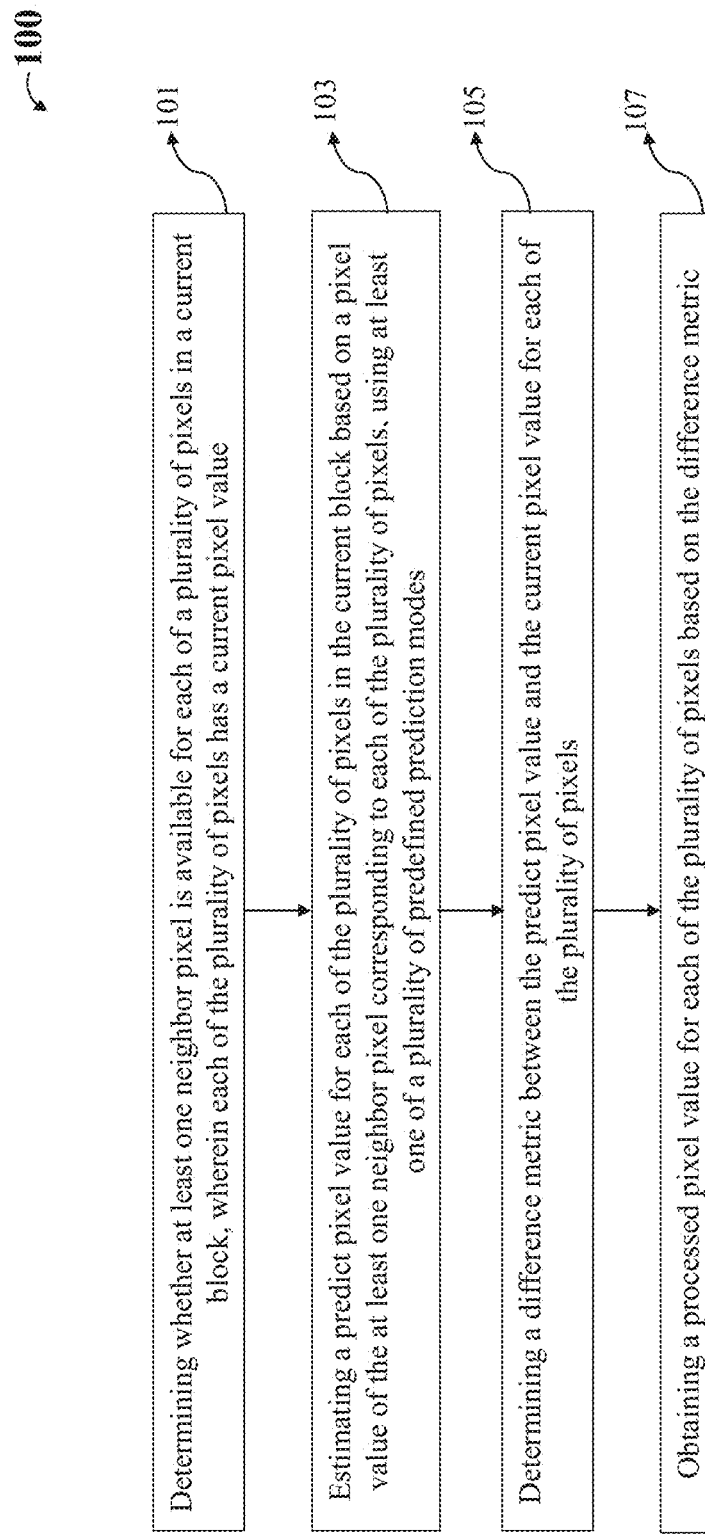
FIG. 1 illustrates a flow diagram depicting a method for performing image signal processing (ISP), in accordance with an embodiment of the present disclosure.

For the purpose of promoting an understanding of the principles of the invention, reference will now be made to embodiments illustrated in the drawings and specific language will be used to describe the same. It will nevertheless be understood that no limitation of the scope of the invention is thereby intended.

At least one embodiment of the present disclosure provides a low power ISP technique which uses neighboring spatial information. Also, the present disclosure provides techniques which may result in increased image quality.

Figure 2:
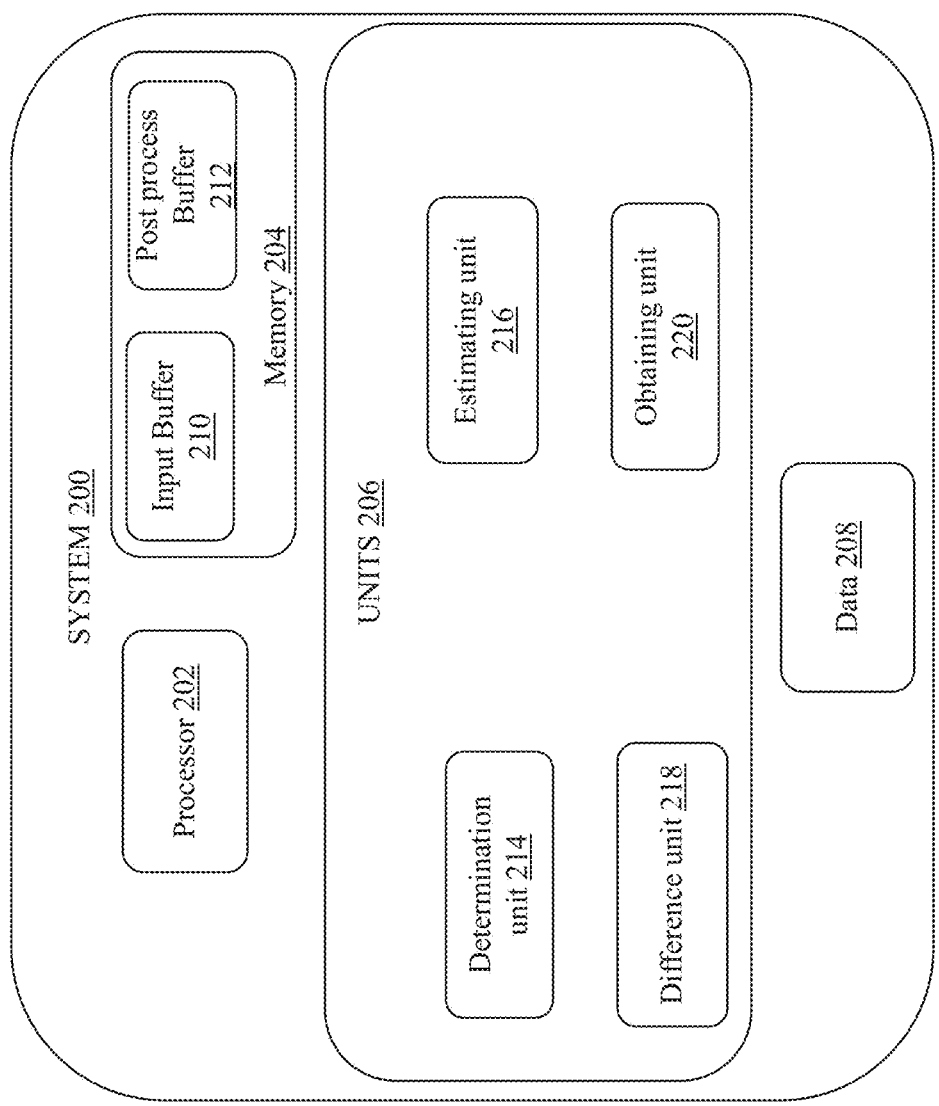
FIG. 2 illustrates a block diagram of a system for performing image signal processing (ISP), in accordance with an embodiment of the present disclosure.
Figure 3:
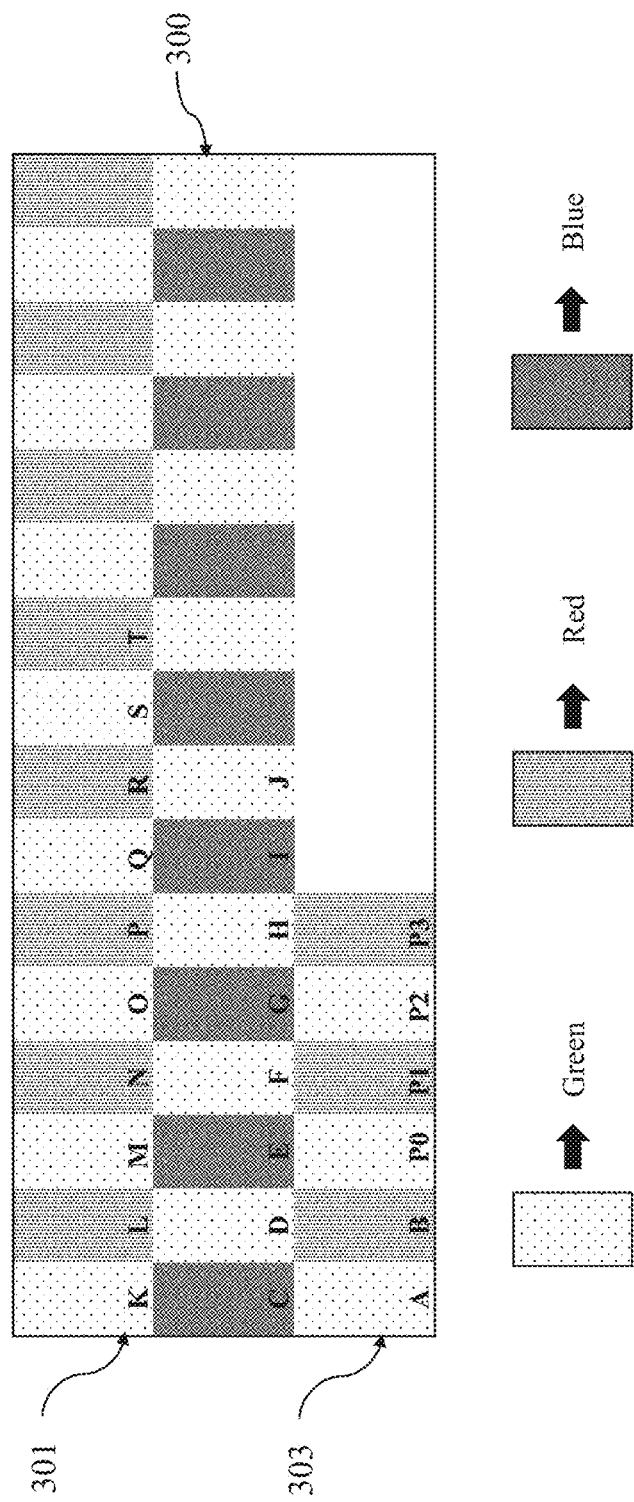
FIG. 3 illustrates an exemplary block of pixels for performing an ISP, in accordance with an embodiment of the present disclosure.

FIG. 1 illustrates a flow diagram depicting a method for performing image signal processing (ISP), in accordance with an embodiment of the present disclosure. FIG. 2 illustrates a block diagram of a system for performing image signal processing (ISP), in accordance with an embodiment of the present disclosure. For the sake of brevity, the description of the FIGS. 2 and 3 are explained in conjunction with each other.

The system 200 may include, but is not limited to, a processor 202, memory 204, units 206, and data unit 208. The units 206 and the memory 204 may be coupled to the processor 202.

The processor 202 can be a single processing unit or several units, all of which could include multiple cores or computing units. The processor 202 may be implemented as one or more microprocessors, microcomputers, microcontrollers, digital signal processors, central processing units, state machines, logic circuitries, and/or any electronic devices that manipulate signals based on operational instructions. Among other capabilities, the processor 202 is configured to fetch and execute computer-readable instructions and data stored in the memory 204.

The memory 204 may include a non-transitory computer-readable medium, for example, a volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 204 may include an input buffer 210 and a post process buffer 212.

The units 206 amongst other things, include routines, programs, objects, components, data structures, etc., which perform particular tasks or implement data types. The units 206 may also be implemented as, signal processor(s), state machine(s), logic circuitries, and/or any other electronic device or component that manipulate signals based on operational instructions.

Further, the units 206 can be implemented in hardware, instructions executed by a processing unit, or by a combination thereof. The processing unit can comprise a computer, a processor, such as the processor 202, a state machine, a logic array, or any other suitable electronic devices capable of processing instructions. The processing unit can be a general-purpose processor which executes instructions to cause the general-purpose processor to perform the required tasks or, the processing unit can be dedicated to performing the required functions. In another embodiment of the present disclosure, the units 206 may be machine-readable instructions (software) which, when executed by a processor/processing unit, perform any of the described functionalities.

In an embodiment, the units 206 may include a determination unit 214, an estimation unit 216, a difference unit 218, and an obtaining unit 220.

The various units 214-220 may be in communication with each other. In an embodiment, the various units 214-220 may be a part of the processor 202. In another embodiment, the processor 202 may be configured to perform the functions of units 214-220. The data unit 208 serves, amongst other things, as a repository for storing data processed, received, and generated by one or more of the units 206. In another embodiment, the processor 202 may be configured to perform techniques discussed in reference to FIGS. 1 and 3-7. The data unit 208 may be a storage device or a database.

It should be noted that the system 200 may be a part of an electronic device. In another embodiment, the system 200 may be connected to the electronic device. It should be noted that the term "electronic device" refers to any electronic devices used by a user such as a mobile device, a desktop, a laptop, personal digital assistant (PDA) or similar electronic devices.

Referring to FIG. 1, at step 101, the method 100 includes determining whether at least one neighbor pixel is available for each of a plurality of current pixels in a current block, wherein each of the plurality of current pixels has a current pixel value. FIG. 3 illustrates an exemplary block of pixels for performing an ISP, in accordance with an embodiment of the present disclosure. FIG. 3 shows a current block of pixels 300 and accordingly, the determination unit 214 may determine if at least one neighbor pixel from row 1 (e.g., 301), row 2 (e.g., 302) and pixels A and B, is available for each of the plurality of current pixels (P0, P1, P2, P3). It should be noted that each of the plurality of current pixels (P0, P1, P2, P3) has a current pixel value. In an embodiment, the current pixel value may depend on bit depth of an input image displayed on the current block of pixels. For example, if the input image is 8 bits, then the current pixel value may be in within a range from 0 to 255. However, if the input image is 10 bits, then the current pixel value may be in within a range from 0 to 1023. For example, the current pixel value for the plurality of current pixels (P0, P1, P2, P3) may be 0, 1, 2 and 3, respectively.

If at step 101, it is determined that the at least one neighbor pixel is available for each of the plurality of current pixels (P0, P1, P2, P3) in the current block, then, at step 103, the method 100 includes estimating a predict pixel value for each of the plurality of current pixels in the current block based on a pixel value of the at least one neighbor pixel corresponding to each of the plurality of current pixels, using at least one of a plurality of predefined prediction modes. However, if at step 101, it is determined that the at least one neighbor pixel is not available for each of the plurality of current pixels (P0, P1, P2, P3) in the current block, then the ISP may be performed on the current block of plurality of current pixels.

Then, at step 105, the method 100 includes determining a difference metric between the predict pixel value and the current pixel value for each of the plurality of current pixels. For example, the difference unit 218 may determine a difference metric between the predict pixel value and the current pixel value for each of the plurality of current pixels (P0, P1, P2, P3). In an embodiment, the difference metric may refer to sum of absolute difference.

Figure 4A:
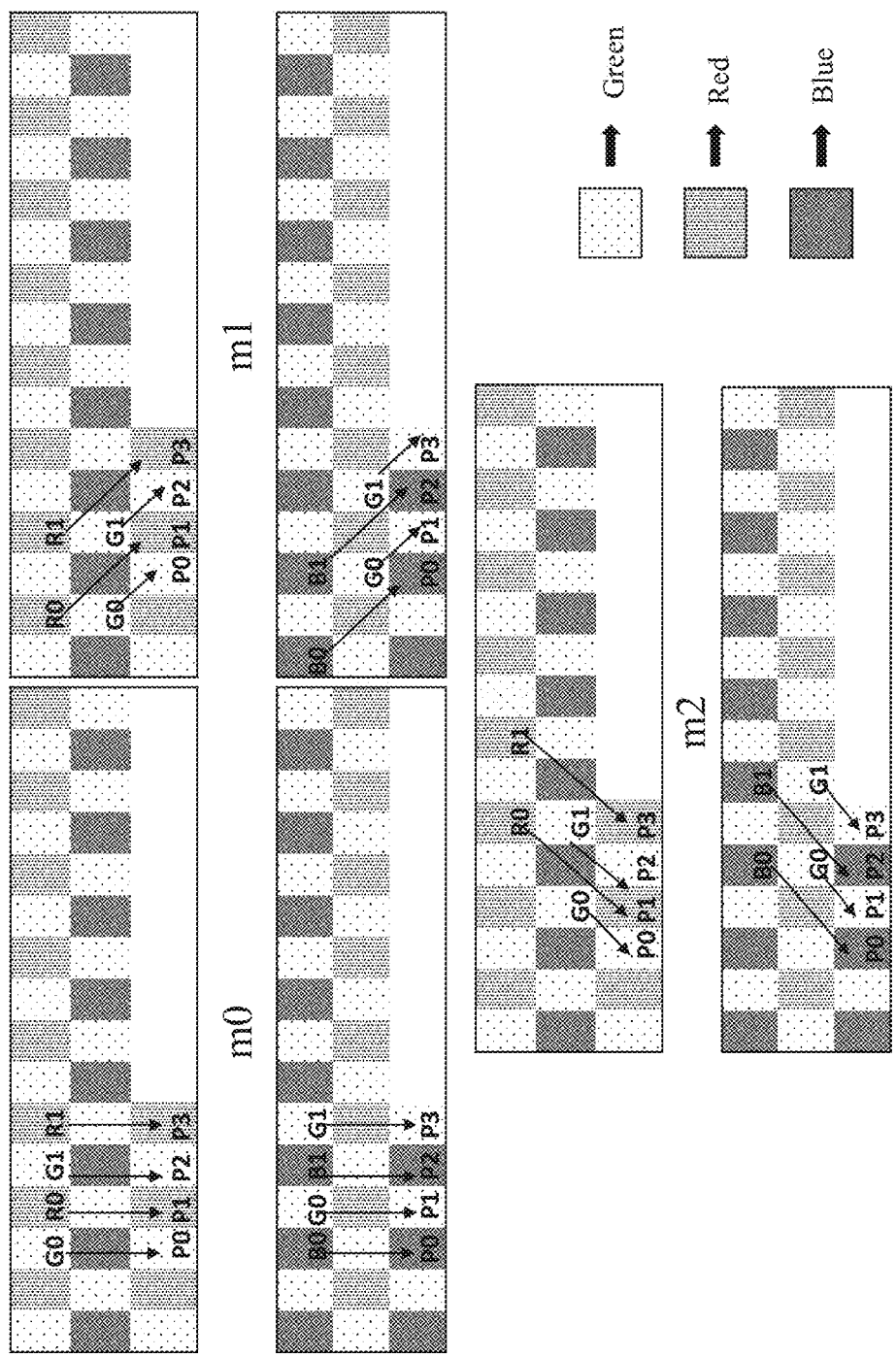
FIGS. 4-6 illustrate a plurality of predefined prediction modes, in accordance with an embodiment of the present disclosure.
Figure 4B:
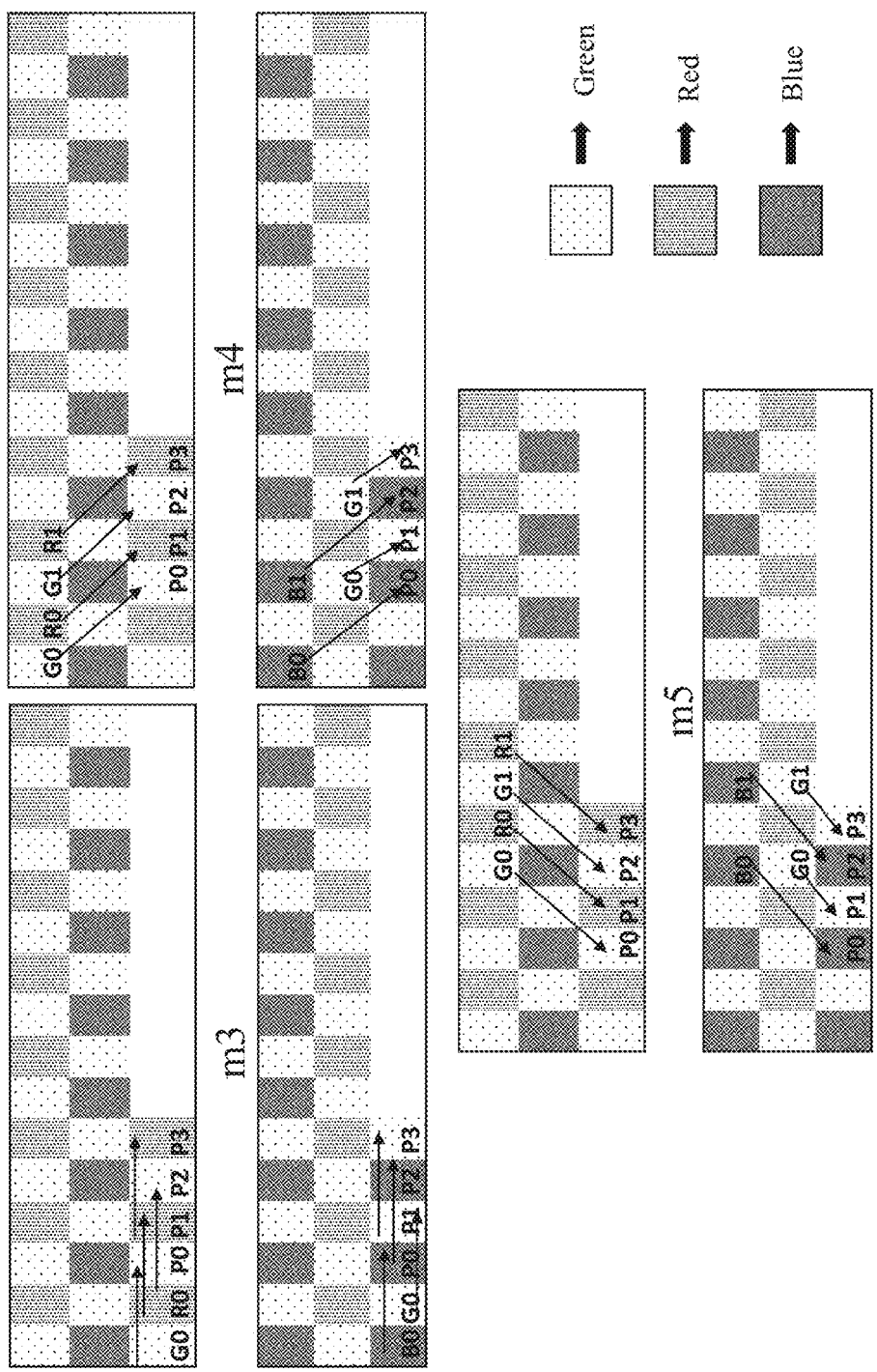
Figure 5A:
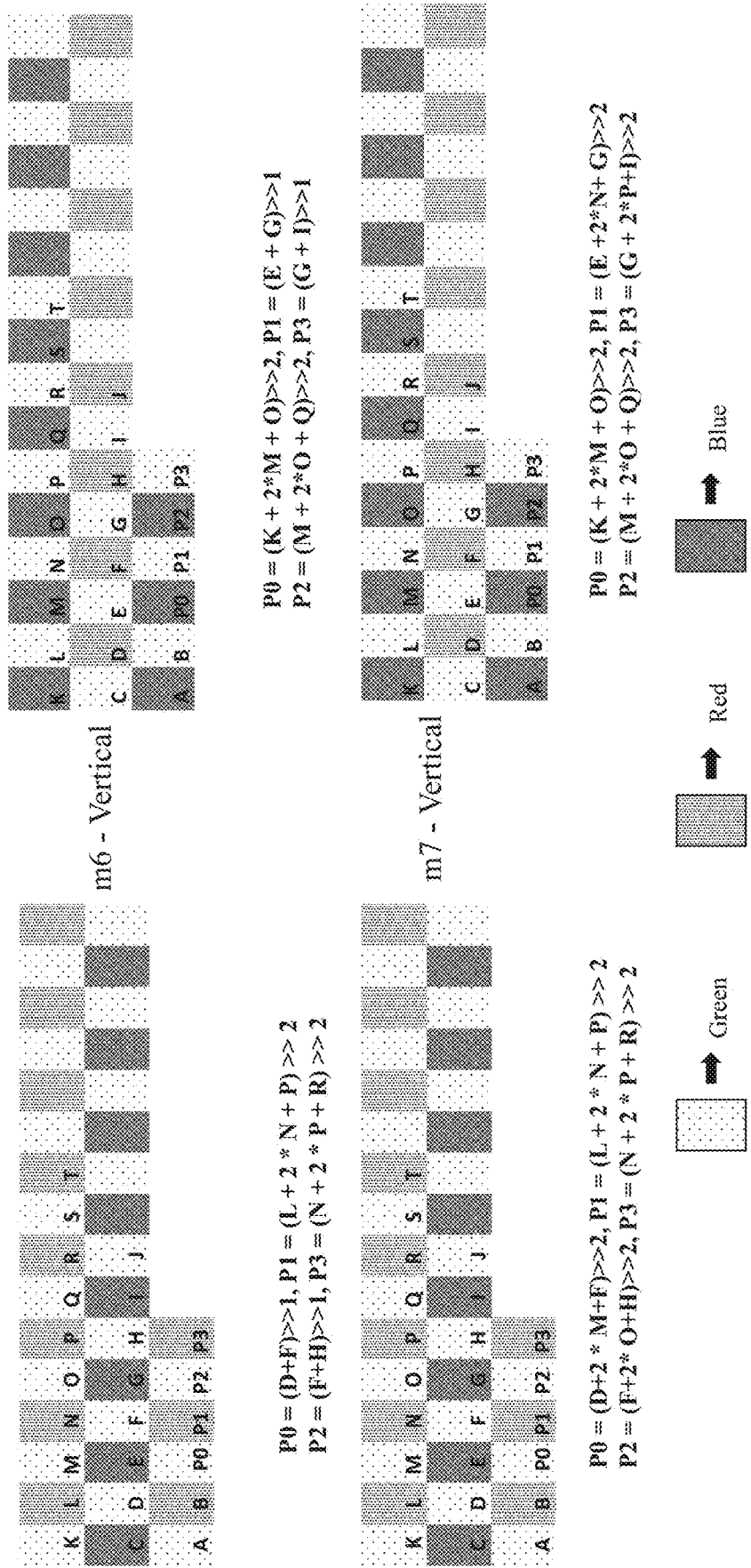
Figure 5B:
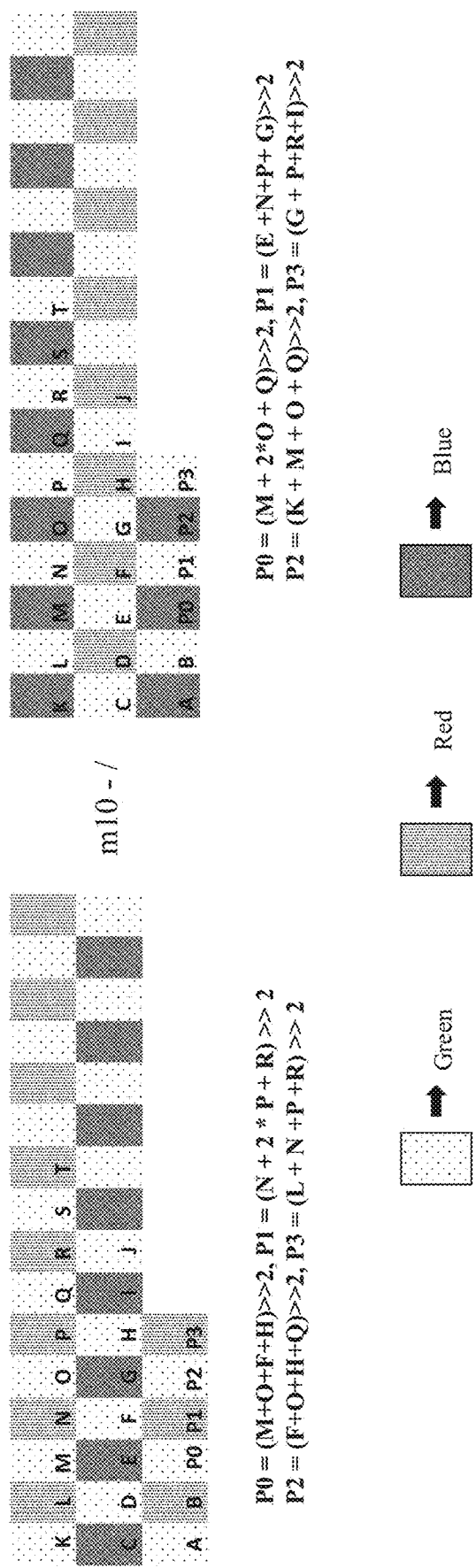
Figure 6A:
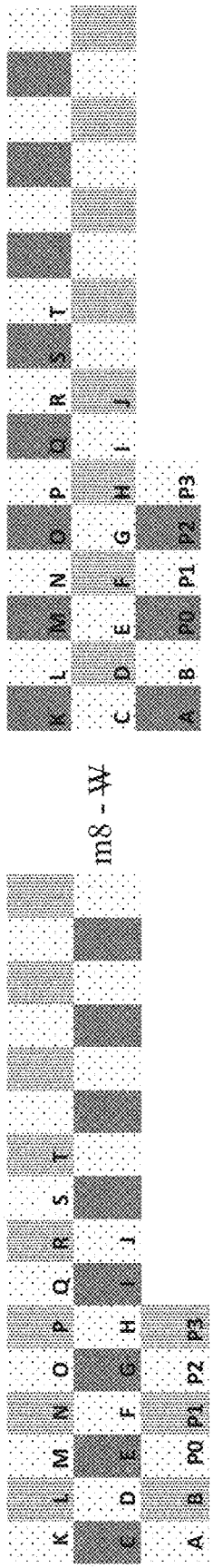
Figure 6A:
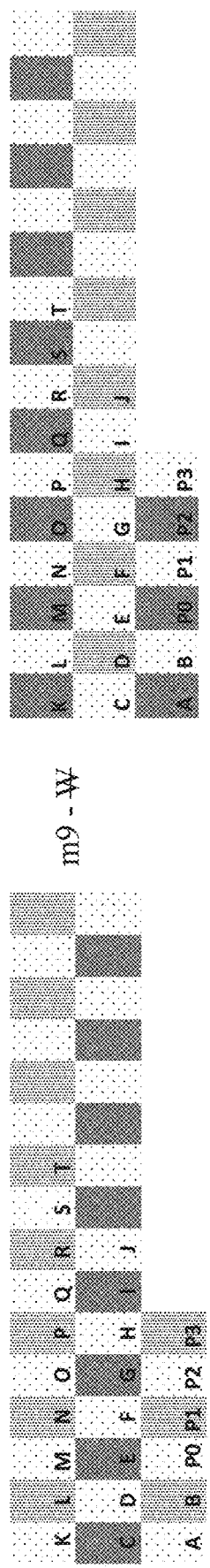
Figure 6A:
Figure 6B:
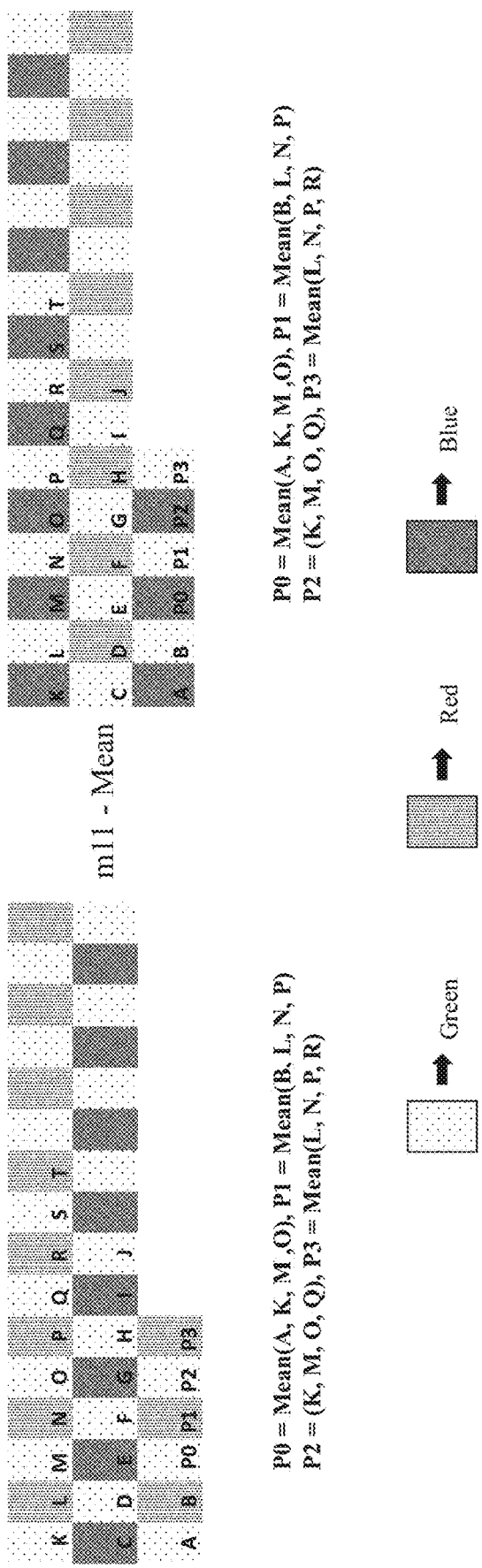

Referring back to step 103, each of the plurality of predefined prediction modes define a prediction process to estimate the predict pixel value. FIGS. 4-6 illustrate a plurality of predefined prediction modes, in accordance with an embodiment of the present disclosure. As shown in FIGS. 4-6, there may be plurality of predefined modes m0-m11. It should be noted that FIGS. 4-6 illustrate only few examples of possible predefined modes and any other can be defined by a user. In an embodiment, as shown in FIG. 4, in mode m0, the estimation unit 216 may estimate the predict pixel value of a current pixel as a pixel value of its corresponding neighbor pixel in a vertical direction. For example, the predict pixel value of each of the current pixel (p0, p1, p2, p3) may be equal to a pixel value of its corresponding neighbor pixel in vertical direction, i.e., G0, R0, G1, R1, respectively or B0, G0, B1, G1, respectively. In an embodiment, the corresponding neighbor pixel in the vertical direction, is a nearest pixel of a same color within the block 300 in the vertical direction relative to the current pixel, which need not be directly adjacent to the current pixel. For example, as shown in mode m0 of FIG. 4, the pixel directly above pixel p0 has a different color (blue) from the color (green) of pixel p0, and thus is not considered to be a neighbor pixel in the vertical direction within the same block.

In another embodiment, as shown in FIG. 4, in mode m1, the estimation unit 216 may estimate the predict pixel value of a current pixel as a pixel value of its corresponding previous neighbor pixel in diagonal vertical direction in a previous row or in an alternate row. For example, the predict pixel value of each of the current pixel (p0, p1, p2, p3) may be equal to a pixel value of its corresponding previous neighbor pixel in a diagonal vertical direction in a previous row or in an alternate row, i.e., R0, G0, R1, G1, respectively or B0, G0, B1, G1, respectively. In an embodiment, the corresponding neighbor pixel in the diagonal vertical direction, is a nearest pixel of a same color within the block 300 in the diagonal direction to the left of the current pixel, which need not be directly adjacent to the current pixel. For example, as shown in the upper part of mode m1 of FIG. 4, the pixel diagonally to the left of pixel p1 and directly adjacent to pixel p1 has a different color (blue) from the color (red) of pixel p1 and thus is not considered to be a neighbor pixel in the diagonal vertical direction.

In another embodiment, as shown in FIG. 4, in mode m2, the estimation unit 216 may estimate the predict pixel value of a current pixel as a pixel value of its corresponding next neighbor pixel in diagonal vertical direction in a previous row or in an alternate row. For example, the predict pixel value of each of the current pixel (p0, p1, p2, p3) may be equal to a pixel value of its corresponding next neighbor pixel in diagonal vertical direction in a previous row or in an alternate row, i.e., G0, R0, G1, R1, respectively or B0, G0, B1, G1, respectively. In an embodiment, the corresponding neighbor pixel in the diagonal vertical direction, is a nearest pixel of a same color within the block 300 in the diagonal direction to the right of the current pixel, which need not be directly adjacent to the current pixel. For example, as shown in the upper part of mode m2 of FIG. 4, the pixel diagonally to the right of pixel p1 and directly adjacent to pixel p1 has a different color (blue) from the color (red) of pixel p1 and thus is not considered to be a neighbor pixel in the diagonal vertical direction.

In another embodiment, as shown in FIG. 4, in mode m3, the estimation unit 216 may estimate the predict pixel value of a current pixel as a pixel value of its corresponding previous neighbor pixel in horizontal direction. For example, the predict pixel value of each of the current pixel (p0, p1, p2, p3) may be equal to a pixel value of its corresponding next neighbor pixel in horizontal direction, i.e., G0, R0, G1, R1, respectively or B0, G0, B1, G1, respectively. In an embodiment, the corresponding neighbor pixel in the horizontal direction, is a nearest pixel of a same color within the block 300 in the horizontal direction to the left of the current pixel, which need not be directly adjacent to the current pixel. For example, as shown in the upper part of mode m3 of FIG. 4, the pixel horizontally to the left of pixel p0 and directly adjacent to pixel p0 has a different color (red) from the color (green) of pixel p0 and thus is not considered to be a neighbor pixel in the diagonal horizontal direction.

In another embodiment, as shown in FIG. 4, in mode m4, the estimation unit 216 may estimate the predict pixel value of a current pixel as a pixel value of its corresponding previous neighbor pixel in diagonal vertical direction in an alternate row. For example, the predict pixel value of each of the current pixel (p0, p1, p2, p3) may be equal to a pixel value of its corresponding previous neighbor pixel in diagonal vertical direction in an alternate row, i.e., G0, R0, G1, R1, respectively or B0, G0, B1, G1, respectively. In an embodiment, the corresponding neighbor pixel in the diagonal vertical direction, is located two-pixel rows away from the pixel row of the current pixel, located diagonally to the left of the current pixel, and has a same color. For example, in the upper part of mode m4 of FIG. 4, even though the nearest pixel diagonally to the left of pixel p0 and directly adjacent to pixel p0 has a same color, this pixel is not considered to be the neighbor pixel.

In another embodiment, as shown in FIG. 4, in mode m5, the estimation unit 216 may estimate the predict pixel value of a current pixel as a pixel value of its corresponding next neighbor pixel in diagonal vertical direction in an alternate row. For example, the predict pixel value of each of the current pixel (p0, p1, p2, p3) may be equal to a pixel value of its corresponding next neighbor pixel in diagonal vertical direction in an alternate row, i.e., G0, R0, G1, R1, respectively or B0, G0, B1, G1, respectively. In an embodiment, the corresponding neighbor pixel in the diagonal vertical direction, is located two-pixel rows away from the pixel row of the current pixel, located diagonally to the right of the current pixel, and has a same color. For example, in the upper part of mode m5 of FIG. 4, even though the nearest pixel diagonally to the right of pixel p0 and directly adjacent to pixel p0 has a same color, this pixel is not considered to be the neighbor pixel.

In another embodiment, as shown in FIG. 5, in mode m6, the estimation unit 216 may estimate the predict pixel value of a current pixel according to Equation 1 or Equation 2.

$$P0 = (D+F) \gg 1, P1 = (L+2*N+P) \gg 2 \quad \text{[Equation 1]}$$
$$P2 = (F+H) \gg 1, P3 = (N+2*P+R) \gg 2$$

OR $$P0 = (K+2*M+O) \gg 2, P1 = (E+G) \gg 1 \quad \text{[Equation 2]}$$
$$P2 = (M+2*O+Q) \gg 2, P3 = (G+I) \gg 1$$

In Equation 1, values of pixels D and F are summed and the sum is shifted to the right by one bit to generate the predict pixel value for pixel P0; a value of pixel N is multiplied by 2 to create a product, values of pixels L and P and the product are summed and the sum is shifted by two bits to generate the predict pixel value for pixel P1; values of pixels F and H are summed and the sum is shifted to the right by one bit to generate the predict pixel value for pixel P2; and a value of pixel P is multiplied by 2 to create a product, values of pixels N and R and the product are summed and the sum is shifted by two bits to generate the predict pixel value for pixel P2.

In Equation 2, a value of pixel M is multiplied by 2 to create a product, values of pixels K and O and the product are summed, and the sum is shifted to the right by 2 bits to generate the predict pixel value for pixel P0; values of pixels E and G are summed and the sum is shifted to the right by one bit to generate the predict pixel value for pixel P1; a value of pixel O is multiplied by 2 to create a product, values of pixels M and Q and the product are summed, and the sum is shifted to the right by 2 bits to generate the predict pixel value for pixel P2; and values of pixels G and I are summed and the sum is shifted to the right by one bit to generate the predict pixel value for pixel P3.

In an embodiment, the predict pixel value of a current pixel is based on either 2 neighboring pixels of a same color or 3 neighboring pixels of a same color.

In another embodiment, as shown in FIG. 5, in mode m7, the estimation unit 216 may estimate the predict pixel value according to Equation 3 or Equation 4.

$$P0 = (D + 2*M + F) \gg 2, P1 = (L + 2*N + P) \gg 2 \quad \text{[Equation 3]}$$
$$P2 = (F + 2*O + H) \gg 2, P3 = (N + 2*P + R) \gg 2$$

OR $$P0 = (K + 2*M + O) \gg 2, P1 = (E + 2*N + G) \gg 2 \quad \text{[Equation 4]}$$
$$P2 = (M + 2*O + Q) \gg 2, P3 = (G + 2*P + I) \gg 2$$

In another embodiment, as shown in FIG. 5, in mode m10, the estimation unit 216 may estimate the predict pixel value of a current pixel according to Equation 5 or Equation 6.

$$P0 = (M + O + F + H) \gg 2, P1 = (N + 2*P + R) \gg 2 \quad \text{[Equation 5]}$$
$$P2 = (F + O + H + Q) \gg 2, P3 = (L + N + P + R) \gg 2$$

OR $$P0 = (M + 2*O + Q) \gg 2, P1 = (E + N + P + G) \gg 2 \quad \text{[Equation 6]}$$
$$P2 = (K + M + O + Q) \gg 2, P3 = (G + P + R + I) \gg 2$$

In another embodiment, as shown in FIG. 6, in mode m8, the estimation unit 216 may estimate the predict pixel value of a current pixel according to Equation 7 or Equation 8.

$$P0 = (A + 2*D + M) \gg 2, P1 = (B + 2*L + N) \gg 2 \quad \text{[Equation 7]}$$
$$P2 = (P0 + 2*F + O) \gg 2, P3 = (P1 + 2*N + P) \gg 2$$

OR $$P0 = (A + 2*K + M) \gg 2, P1 = (B + 2*E + N) \gg 2 \quad \text{[Equation 8]}$$
$$P2 = (P0 + 2*F + O) \gg 2, P3 = (P1 + 2*G + P) \gg 2$$

In another embodiment, as shown in FIG. 6, in mode m9, the estimation unit 216 may estimate the predict pixel value of a current pixel according to Equation 9 or Equation 10.

$$P0 = (A + 2*K + M) \gg 2, P1 = (B + 2*L + N) \gg 2 \quad \text{[Equation 9]}$$
$$P2 = (P0 + 2*M + O) \gg 2, P3 = (P1 + 2*N + P) \gg 2$$

OR $$P0 = (A + 2*K + M) \gg 2, P1 = (B + 2*L + N) \gg 2 \quad \text{[Equation 10]}$$
$$P2 = (P0 + 2*F + O) \gg 2, P3 = (P1 + 2*N + P) \gg 2$$

In another embodiment, as shown in FIG. 6, in mode m11, the estimation unit 216 may estimate the predict pixel value of a current pixel according to Equation 11 or Equation 12.

$$P0 = \text{Mean}(A, K, M, O), P1 = \text{Mean}(B, L, N, P) \quad \text{[Equation 11]}$$
$$P2 = (K, M, O, Q), P3 = \text{Mean}(L, N, P, R)$$

OR $$P0 = \text{Mean}(A, K, M, O), P1 = \text{Mean}(B, L, N, P) \quad \text{[Equation 12]}$$
$$P2 = (K, M, O, Q), P3 = \text{Mean}(L, N, P, R)$$

Hence, it can be seen that the plurality of prediction modes may define a prediction process to estimate the predict pixel value.

In another embodiment, to estimate the predict pixel value for each of the plurality of current pixels, the estimation unit 216 may add a weighted value to the predict pixel value before determining the difference metric, wherein the weighted value is determined based on the at least one of the plurality of predefined prediction modes. For example, if the estimation unit 216 estimates the predict value as V1, then the estimation unit 216 may add a weighted value W1 to V1 and the value of W1 may depend on the predefined prediction mode used for determining V1.

In another embodiment, before estimating the predict pixel value for each of the plurality of current pixels, the estimation unit 216 may estimate a plurality of pixel values for each of the plurality of current pixels using each of the plurality of predefined prediction modes. Then, the difference unit 218 may determine a difference metric between each of the plurality of pixel values and the current pixel value. Thereafter, the estimation unit 216 may select the pixel value among the plurality of pixel values as the predict pixel value, wherein the selected pixel value has a minimum difference metric with the current pixel value. For example, in reference to FIGS. 4-6, the estimation unit 216 may estimate the predict pixel value using each of the predefined prediction mode m0-m11. Then, the difference unit 218 may determine a difference metric between each of the plurality of pixel values and the current pixel value as d1-d11, corresponding to each of the modes m0-m11. Then, the estimation unit 216 may select the mode from m0-m11 which provide the least difference metric among d1-d11. For example, if mode m6 is selected as having the least difference metric, then the predict pixel value may be estimated as ((D+F)>>1).

Referring back to FIG. 1, at step 107, the method 100 include obtaining a processed pixel value for each of the plurality of current pixels based on the difference metric. Step 107 may be performed by one of: performing the ISP on the current block of plurality of current pixels, when the difference metric is above a predefined threshold value; and replacing the current pixel value of each of the plurality of current pixels with a pre-processed pixel value corresponding to the at least one neighbor pixel for the each of the plurality of current pixels, when the difference metric is below the predefined threshold value. In particular, if the difference metric is above a predefined threshold value, then the obtaining unit 220 may performing the ISP on the current block of plurality of current pixels (P0, P1, P2, P3) to obtain the processed pixel value for each of the plurality of current pixels. In an embodiment, the obtaining unit 220 may perform the ISP using techniques know to a person skilled in the art. However, if the difference metric is below or equal the predefined threshold value, then the obtaining unit 220 may replace the current pixel value of each of the plurality of current pixels with a pre-processed pixel value corresponding to the at least one neighbor pixel for the each of the plurality of current pixels. In other words, the ISP for the current pixel may be skipped. Instead, the current value may be replaced with the pre-processed pixel value corresponding to the at least one neighbor pixel so that there is no need for performing ISP for the current pixel. Hence, in other words, when the current pixel is skipped, image signal processing is not performed for that current pixel. Instead, the obtaining unit 220 may use the pre-processed value corresponding to the at least one neighbor pixel in place of the current pixel value. In an embodiment, the pre-processed pixel value corresponds to pixel value of the at least one neighbor pixel after performing ISP. In an embodiment, the pre-processed pixel value may be retrieved from a post-process buffer 212. It should be noted that the predefined threshold value may be configurable. For example, the predefined threshold value may be a tunable threshold value such as may be configured by a piecewise linear function. In another embodiment, the predefined threshold value may be configured based on a color specific threshold. In another embodiment, the predefined threshold value may be configured based on a luma aware threshold. Further, it should be noted that in an embodiment, the information whether the image signal processing (ISP) for the current pixel is to be skipped or not is propagated in the image signal processor as this information may be used by image signal processor for power saving. If the ISP is skipped, then the information regarding a predefined prediction mode is used to calculate the value of the pixel at output using the post process buffer 212.

Figure 7:
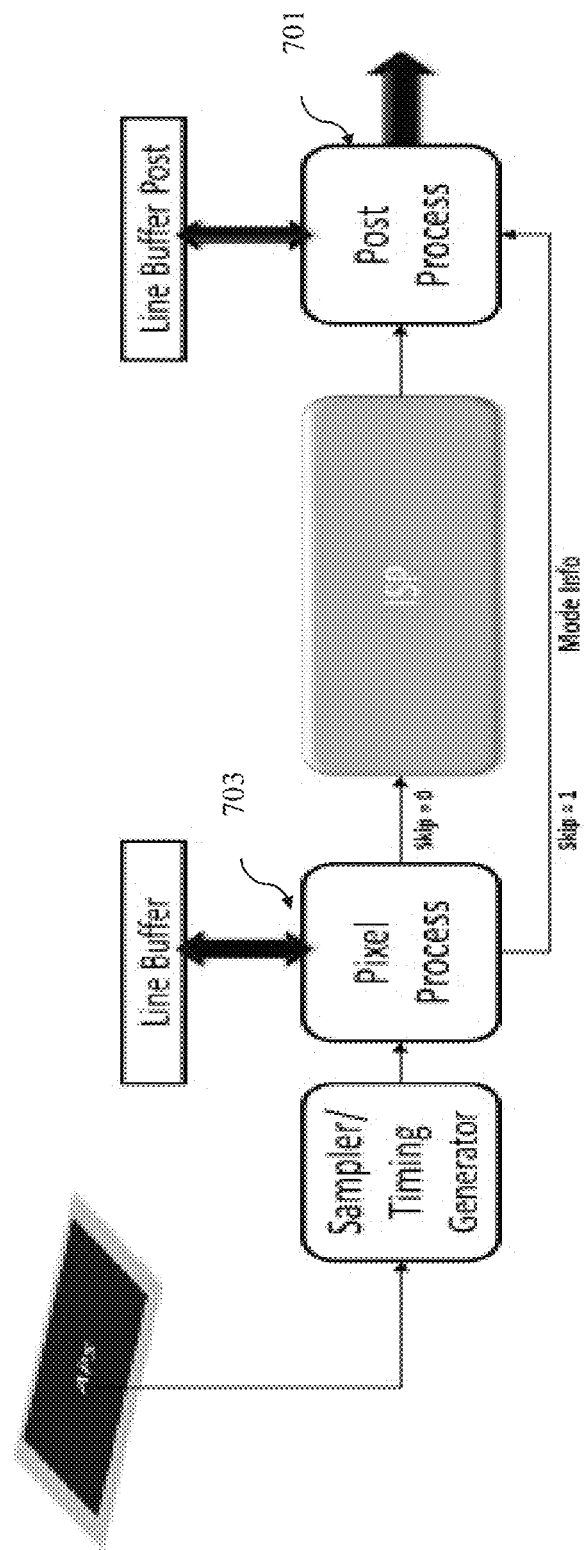
FIG. 7 illustrates a block diagram for processing ISP on a group of pixels, in accordance with an embodiment of the present disclosure.

FIG. 7 illustrates a block diagram for performing an ISP on a group of pixels, in accordance with an embodiment of the present disclosure. When certain pixels, whose ISP is skipped, have their predict pixel values estimated by a 'Post Process' module 701 based on a mode determined by a 'Pixel Process Decision' module 703 (e.g., the estimation unit 218), they differ from the original value of the corresponding current pixel. This introduces an error at the 'Line Buffer Post' (e.g., post process buffer 212). When this current pixel is used at a later instant of time to estimate a pixel sampled in the future, the incurred error is propagated to the same future sampled pixel's output estimate. This is illustrated in Table 1 in FIG. 9(a) with an example of a one-dimensional signal with an input 'line buffer' of up to 2 pixels, where 1 pixel is processed per clock cycle.

Table 1 illustrates an error accumulation leading to loss of structure of data, when the predefined threshold TH is 5. The clear box shows the current pixel. At clock instant 5, the total accumulated absolute error at the output is (|0-4|+|0-8|+|0-12|+|0-16|+|0-20|=60). To prevent run-away error accumulation, the current pixel value of each of the plurality of current pixels in an input buffer 210 may be replaced with the predict pixel value. This may be referred to as 'Write-back' mechanism, which is illustrated in Table 2 in FIG. 9(b).

In addition to populating the 'skipped' pixel's output value, the corresponding pixel's value in the input buffer 210 is also modified as illustrated in Table 2. Table 2 illustrates writeback to input Line Buffer (e.g., input buffer 210) for preventing loss of structure of data (TH=5). The clear box shows the current pixel. Here, the value of the recently sampled pixel in the input Line Buffer is replaced with the predict pixel value. At clock instant 5, the total accumulated absolute error at the output is (|0-4|+|8-12|+|16-20|=12). Hence, the output error is greatly reduced.

However, there are still some corner cases where fine structure in the data can get corrupted, as illustrated in the Table 3 in FIG. 9(c).

To prevent this loss, a mechanism henceforth referred to as 'writeback with error tracking' is employed. Instead of replacing the current pixel in the input Line Buffer with the predict pixel value, an error of the prediction relative to the current pixel is subtracted from the predict pixel value. Hence, an error value is added to the predict pixel value to obtain a modified pixel value and the current pixel value of each of the plurality of current pixels in the input buffer is replaced with the modified pixel value. For example, this additionally de-incentivizes the propagation of even small errors as shown in Table 4 in FIG. 9(d).

The employment of additional error-tracking in the writeback approach mitigates the loss of finer structures of data (TH=5).

In an exemplary embodiment, the pixels described above are pixels of an image sensor of a camera, and when an image of an object is captured by the image sensor, voltages of the pixels may be read from the pixels using a readout circuit, and pixel values are determined from the voltages that are representative of the image. An image signal processor may perform an operation on all of the pixel values generate image data. In an exemplary embodiment, the image signal processor performs the operation on the pixels values of only some of the pixel values to generate part of the image data and the rest of the image data is generated from predicted pixel values without using the image signal process, where the predicted pixel value of one of the pixels of certain color is determined from pixel values of neighboring pixels having the same color.

Figures 8A, 8B, 8C:
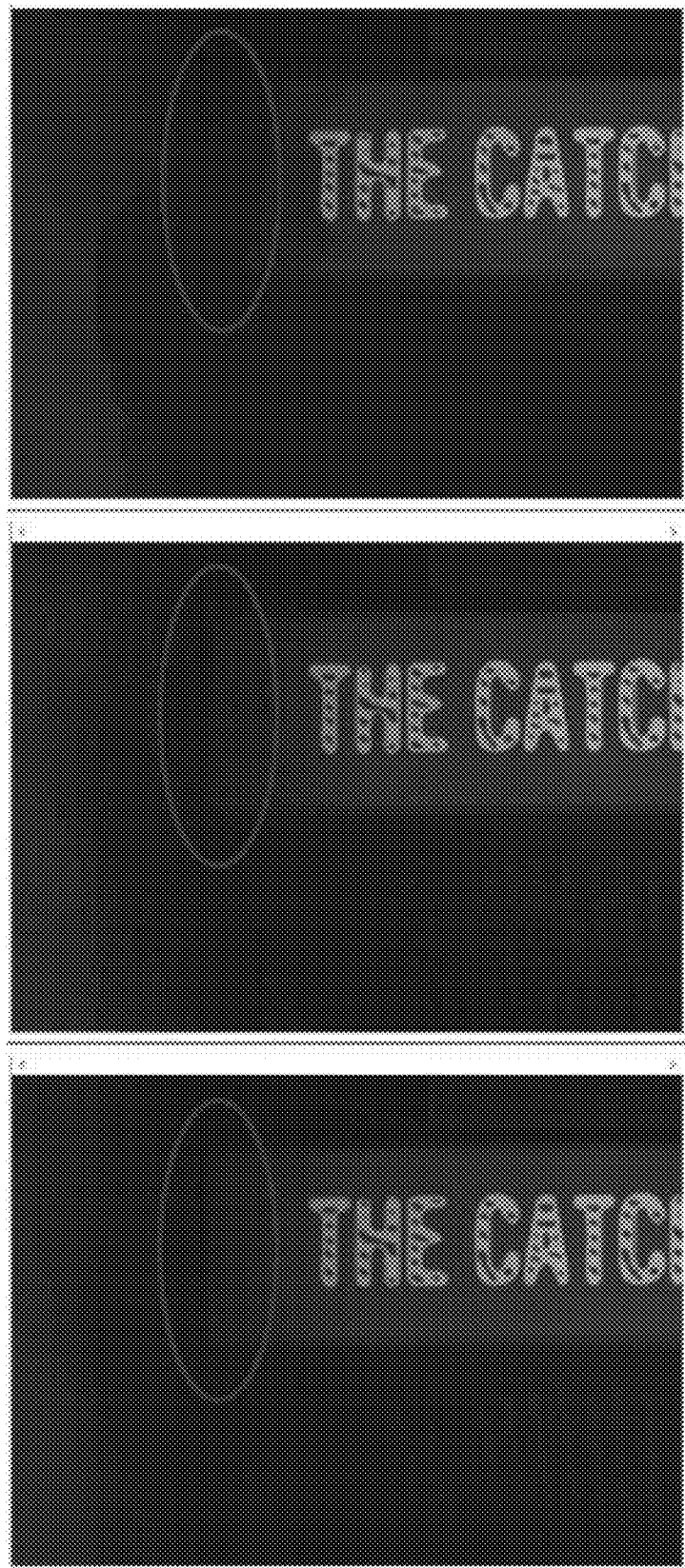
FIGS. 8(a)-8(c) illustrate an original image, image with error tracking and without error tracking, respectively, in accordance with an embodiment of the present disclosure.

FIGS. 8(a)-8(c) illustrate an original image, image with error tracking and without error tracking, respectively, in accordance with an embodiment of the present disclosure. As can be seen from FIGS. 8(a)-8(c), the image has the highest quality with error tracking. Embodiments of the disclosure may reduce power consumption, provide an improved frame rate, increase image quality, provide prediction at a binned pixel level, reduce memory bandwidth, and/or increase speed of image signal processing.

While the inventive concept has been particularly shown and described with reference to embodiments thereof, it will be understood that various changes in form and details may be made therein without departing from the spirit and scope of the claims.

What is claimed is:

1. A method for performing image signal processing (ISP), the method comprising:
    determining whether at least one neighbor pixel is available for each of a plurality of current pixels in a current block, wherein each of the plurality of current pixels has a current pixel value;

estimating a predict pixel value for each of the plurality of current pixels in the current block based on a pixel value of the at least one neighbor pixel corresponding to each of the plurality of current pixels, using at least one of a plurality of predefined prediction modes, in response to determining that the at least one neighbor pixel is available for each of the plurality of current pixels in the current block;

determining a difference metric between the predict pixel value and the current pixel value for each of the plurality of current pixels; and obtaining a processed pixel value for each of the plurality of current pixels by one of:

performing the ISP on the current block of plurality of current pixels, when the difference metric is above a predefined threshold value; and replacing the current pixel value of each of the plurality of current pixels with a pre-processed pixel value corresponding to the at least one neighbor pixel for the each of the plurality of current pixels, when the difference metric is not above the predefined threshold value.

2. The method of claim 1, wherein the pre-processed pixel value corresponds to a pixel value of the at least one neighbor pixel after performing the ISP.

3. The method of claim 1, further comprising:

performing the ISP on the current block of plurality of current pixels, when the at least one neighbor pixel is not available for each of the plurality of current pixels in the current block.

4. The method of claim 1, wherein the estimating of the predict pixel value for each of the plurality of current pixels comprises:

adding a weighted value to the predict pixel value before determining the difference metric, wherein the weighted value is determined based on the at least one of the plurality of predefined prediction modes.

5. The method of claim 1, wherein the estimating of the predict pixel value for each of the plurality of current pixels comprises:

estimating a plurality of pixel values for each of the plurality of current pixels using each of the plurality of predefined prediction modes;

determining a difference metric between each of the plurality of pixel values and the current pixel value for each of the predefined prediction modes to generate a plurality of difference metrics; and selecting the pixel value among the plurality of pixel values as the predict pixel value, wherein the selected pixel value has a minimum difference metric with the current pixel value among the plurality of different metrics.

6. The method of claim 1, wherein the pre-processed pixel value is retrieved from a post-process buffer.

7. The method of claim 1, further comprising:

replacing the current pixel value of each of the plurality of current pixels in an input buffer with the predict pixel value.

8. The method of claim 1, further comprising:

adding an error value to the predict pixel value to obtain a modified pixel value; and replacing the current pixel value of each of the plurality of current pixels in an input buffer with the modified pixel value.

9. The method of claim 1, wherein each of the plurality of predefined prediction modes define a prediction process to estimate the predict pixel value.

10. A system for performing image signal processing (ISP), the system comprising:

a memory; and a processor coupled to the memory and configured to:

determine whether at least one neighbor pixel is available for each of a plurality of current pixels in a current block, wherein each of the plurality of current pixels has a current pixel value;

estimate a predict pixel value for each of the plurality of current pixels in the current block based on a pixel value of the at least one neighbor pixel corresponding to each of the plurality of current pixels, using at least one of a plurality of predefined prediction modes, in response to determining that the at least one neighbor pixel is available for each of the plurality of current pixels in the current block;

determine a difference metric between the predict pixel value and the current pixel value for each of the plurality of current pixels; and obtain a processed pixel value for each of the plurality of current pixels by one of:

perform the ISP on the current block of plurality of current pixels, when the difference metric is above a predefined threshold value; and replace the current pixel value of each of the plurality of current pixels with a pre-processed pixel value corresponding to the at least one neighbor pixel for the each of the plurality of current pixels, when the difference metric is not above the predefined threshold value.

11. The system of claim 10, wherein the pre-processed pixel value corresponds to pixel value of the at least one neighbor pixel after performing the ISP.

12. The system of claim 10, wherein the processor is configured to:

perform the ISP on the current block of plurality of current pixels, when the at least one neighbor pixel is not available for each of the plurality of current pixels in the current block.

13. The system of claim 10, wherein for estimating the predict pixel value for each of the plurality of current pixels, the processor is configured to:

add a weighted value to the predict pixel value before determining the difference metric, wherein the weighted value is determined based on the at least one of the plurality of predefined prediction modes.

14. The system of claim 10, wherein for the estimate of the predict pixel value for each of the plurality of current pixels, the processor is configured to:

estimate a plurality of pixel values for each of the plurality of current pixels using each of the plurality of predefined prediction modes;

determine a difference metric between each of the plurality of pixel values and the current pixel value for each of the predefined prediction modes to generate a plurality of difference metrics; and select the pixel value among the plurality of pixel values as the predict pixel value, wherein the selected pixel value has a minimum difference metric with the current pixel value from among the difference metrics.

15. The system of claim 10, wherein the pre-processed pixel value is retrieved from a post-process buffer.

16. The system of claim 10, wherein the processor is configured to replace the current pixel value of each of the plurality of current pixels in an input buffer with the predict pixel value.

17. The system of claim 10, wherein the processor is configured to:
   add an error value to the predict pixel value to obtain a modified pixel value; and
   replace the current pixel value of each of the plurality of current pixels in an input buffer with the modified pixel value.

18. The system of claim 10, wherein each of the plurality of predefined prediction modes define a prediction process to estimate the predict pixel value.

19. A method for processing pixels of an image sensor, the method comprising:
   estimating a predict pixel value for a pixel of among the pixels having a current pixel value using at least one of the pixels neighboring the pixel;
   determining a difference metric between the predict pixel value and the current pixel value;
   performing, by an image signal processor, an operation on the predict pixel value when the difference metric is greater than a threshold to generate image data; and
   generating the image data based on the predict pixel value when the difference metric is not above the threshold without using the image signal processor.

20. The method of claim 19, wherein the at least one neighboring pixel has a same color as the pixel.

* * * * *